US006535476B1

(12) United States Patent
Haga (10) Patent No.: US 6,535,476 B1
(45) Date of Patent: Mar. 18, 2003

(54) DISC CLAMP MECHANISM FOR DISC APPARATUS

(75) Inventor: Yosuke Haga, Ohmiya (JP)

(73) Assignee: Kabushiki Kaisha Kenwood, Tokyo (JP)

(*) Notice: Subject to any disclaimer, the term of this patent is extended or adjusted under 35 U.S.C. 154(b) by 0 days.

(21) Appl. No.: 09/582,231

(22) PCT Filed: Oct. 7, 1999

(86) PCT No.: PCT/JP99/05550

§ 371 (c)(1),
(2), (4) Date: Jul. 21, 2000

(87) PCT Pub. No.: WO00/33304

PCT Pub. Date: Jun. 8, 2000

(30) Foreign Application Priority Data

Nov. 27, 1998 (JP) .......................................... 10-336721

(51) Int. Cl.⁷ ...................... G11B 17/028; G11B 17/035
(52) U.S. Cl. ....................................................... 369/270
(58) Field of Search ............................... 369/77.1, 77.2, 369/270, 271, 264

(56) References Cited

U.S. PATENT DOCUMENTS 5,784,351 A * 7/1998 Takagi ........................ 369/77.2

FOREIGN PATENT DOCUMENTS

| JP | 62-125568 | 6/1987 | |
| JP | 64-5257 | 1/1989 | |
| JP | 03137858 A | * 6/1991 | ......... G11B/17/028 |
| JP | 06052615 A | * 2/1994 | ........... G11B/17/04 |
| JP | 8-2838 | 1/1996 | |
| JP | 10-92077 | 4/1998 | |
| JP | 10-312628 | 11/1998 | |
| JP | 11-96635 | 4/1999 | |
| JP | 11-250538 | 9/1999 | |
| JP | 11-250539 | 9/1999 | |
| WO | WO 99/16064 | 4/1999 | |

* cited by examiner

Primary Examiner—William Klimowicz
(74) Attorney, Agent, or Firm—Eric J. Robinson; Robinson Intellectual Property Law Office, P.C.

(57) ABSTRACT

A contact between a clamper holder and clamper and between the clamper holder and disc can be reliably prevented while the disc is rotated. A disc clamp mechanism for a disc apparatus for clamping or unclamping a disc by moving a clamper holding chassis near to or remote from a turntable, the clamper holding chassis holding a clamper with a clamper holder, wherein: a lever is rotatively supported by the clamper holding chassis and moved in cooperation with a motion of the clamper holding chassis; and a contact portion of the clamper holder with the clamper is displaced in a motion direction of the clamper holding chassis and a clamper radial direction relative to the clamper holding chassis, in cooperation with a motion of the lever relative to the clamper holding chassis.

15 Claims, 10 Drawing Sheets

DISC CLAMP MECHANISM FOR DISC APPARATUS

BACKGROUND OF THE INVENTION

1. Field of the Invention

The present invention relates to a disc drive such as a CD player, and more particularly to a disc clamp mechanism capable of thinning a disc drive.

2. Description of the Related Art

Figure 7A:
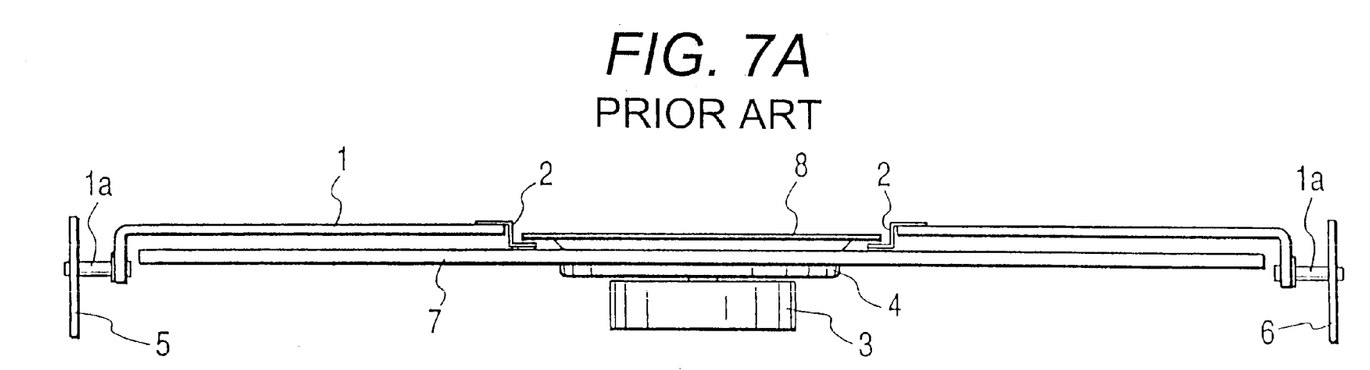
FIGS. 7A and 7B are front views showing an outline of the structure of a conventional disc clamp mechanism for a CD player.

An example of a conventional disc clamp mechanism for a CD player is shown in FIGS. 7A to 9B. As shown in FIGS. 7A and 7B, a disc motor 3 is fixedly mounted on a main chassis (not shown), and a turntable 4 is fixedly connected to a rotary shaft of the disc motor 3. A clamper holder 2 fixed to a clamper holding chassis 1 holds a clamper 8 over the turntable 4 when a disc 7 is unclamped, as shown in FIG. 7B.

Figure 8:
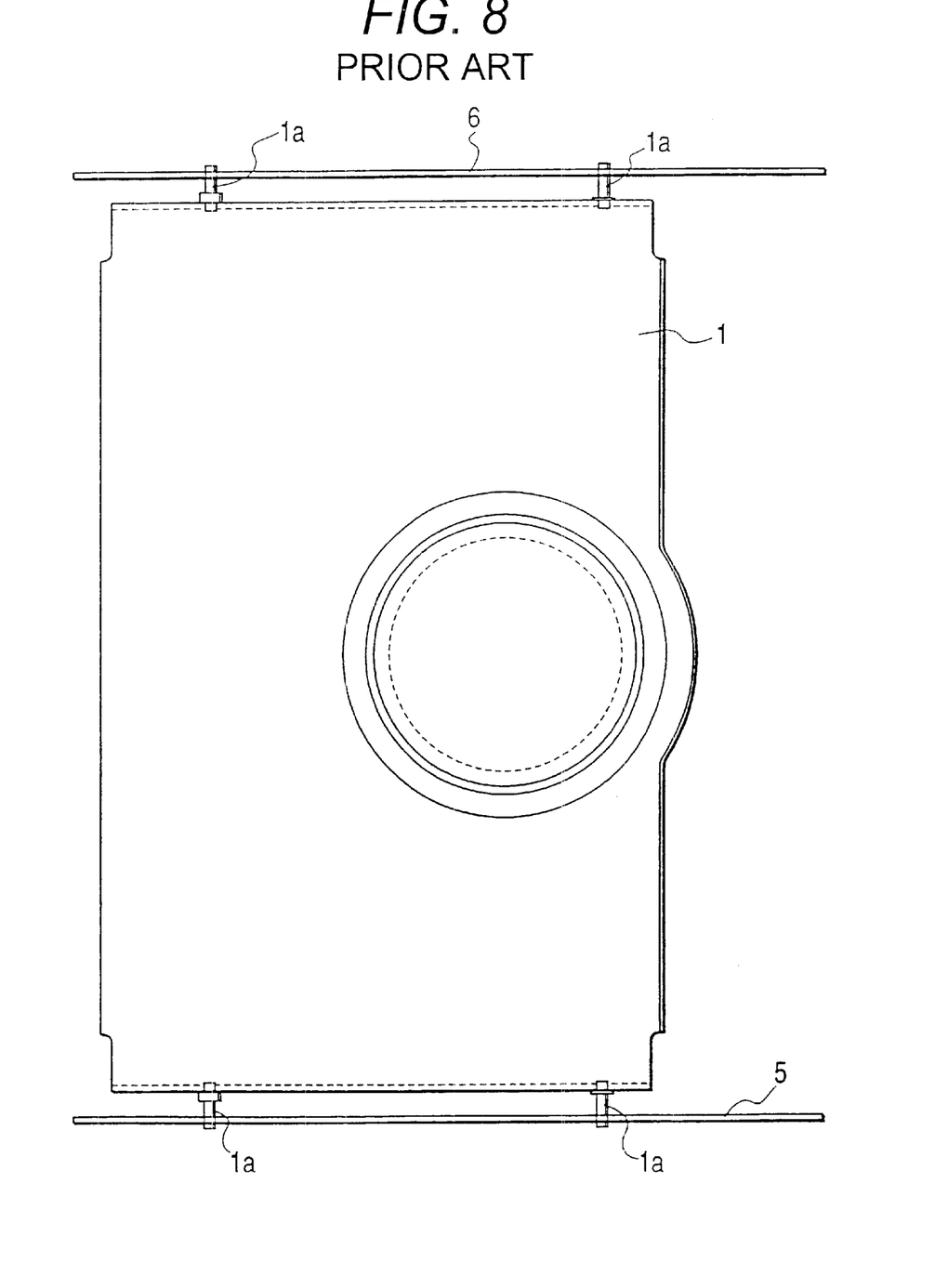
FIG. 8 is a plan view of the disc clamp mechanism shown in FIGS. 7A and 7B.
Figure 9A:
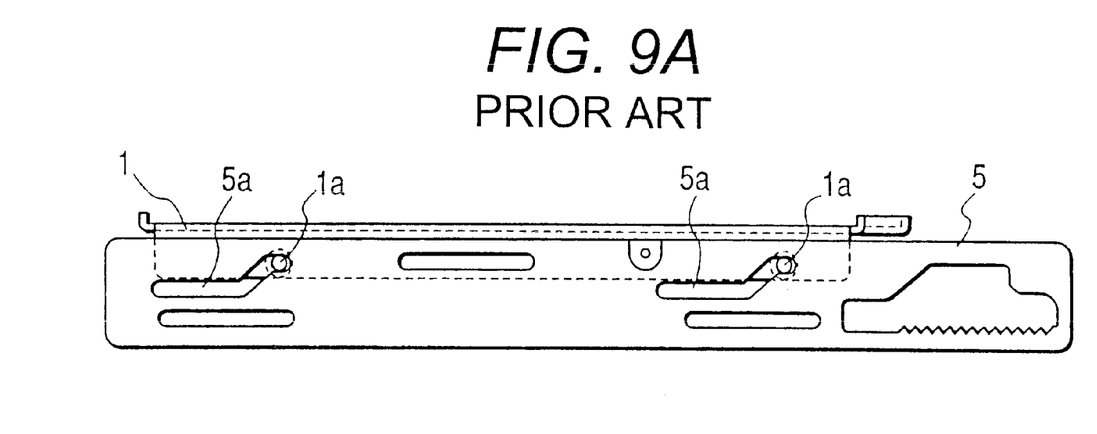
FIGS. 9A and 9B are side views illustrating the operation of the disc clamp mechanism shown in FIGS. 7A and 7B.
Figure 9B:
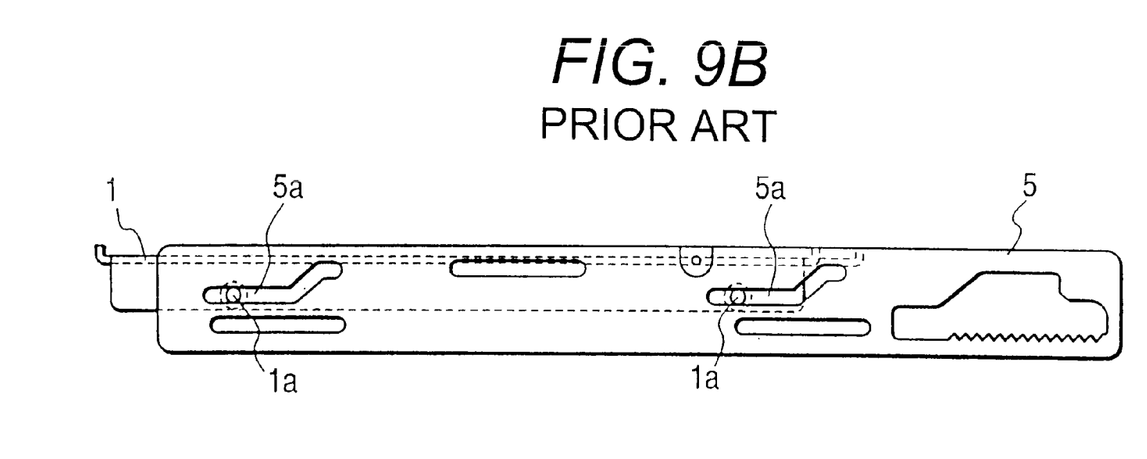

A lift mechanism for the clamper holding chassis 1 is shown in FIG. 8 and FIGS. 9A and 9B. Shafts 1a, 1a . . . mounted upright on side walls of the clamper holding chassis 1 are inserted into cam grooves 5a, 5a, . . . of sliders 5 and 6.

The sliders 5 and 6 are driven back and forth relative to the main chassis by an unrepresented drive mechanism. As the sliders 5 and 6 move, the clamper holding chassis 1 is raised and lowered. The shafts 1a, 1a, . . . are also inserted into vertical grooves (not shown) of the main chassis.

Figure 7B:
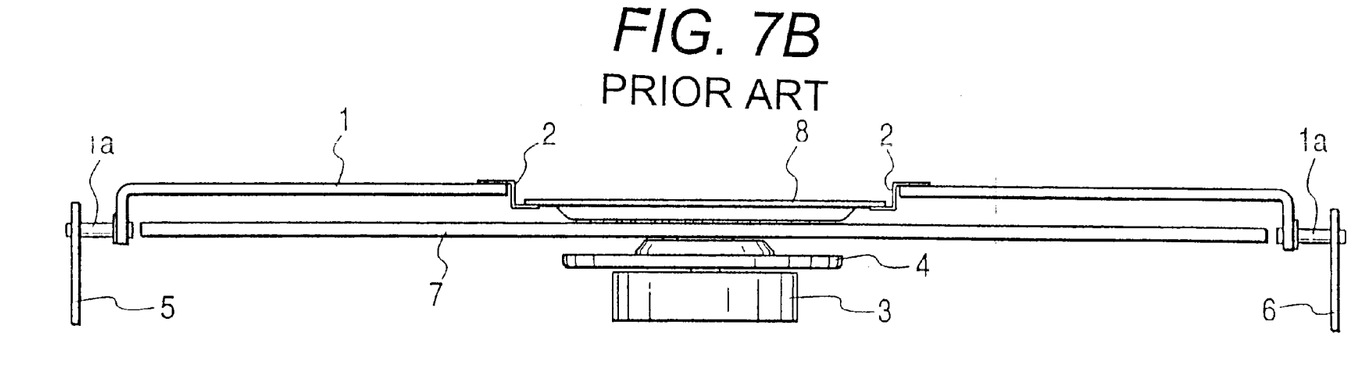

In the disc unclamp state shown in FIG. 7B, the clamper holding chassis 1 is at a raised position. The disc 7 is transported by an unrepresented transport mechanism to a position over the turntable 4 via a space between the turntable 4 and clamper 8. Thereafter, as the clamper holding chassis 1 is lowered, the clamper holder 2 places the clamper 8 on the turntable 4 and becomes spaced apart from the clamper 8.

The clamper 8 is then attracted by a magnetic force of the turntable 4 to squeeze the disc 7 between the clamper 8 and turntable 4. This state is a clamp state of the disc 7 as shown in FIG. 7A. The clamped disc 7 is rotated by the disc motor 3, and an unrepresented optical pickup element is fed along a disc radial direction to reproduce data recording in the disc 7.

Unclamping the disc 7 is conducted by raising the clamper holding chassis 1 from the position shown in FIG. 7A. The clamper holder 2 is made of a thin plate in order to prevent a contact with the disc 7 and turntable 4 while the disc 7 is clamped.

In the conventional disc clamp mechanism described above, the clamper 8 greatly lowers toward the turntable 4 from the bottom surface of the clamper holding chassis 1 in the disc unclamp state. It is therefore difficult to provide a large space between the clamper 8 and turntable 4. From this reason, the disc 7 may contact the clamper 8 or turntable 4 while it is transported and the disc 7 may be damaged.

If a lift stroke of the clamper holding chassis 1 is made large, a large space can be formed between the clamper 8 and turntable 4. However in this case, a height of the apparatus becomes large.

The applicant of this application filed JP Patent Application No. 9-273540 which proposes a disc clamp mechanism for a disc apparatus capable of solving the above problems and providing a large space between a clamper and a turntable in a disc unclamp state even if the apparatus is made compact. This disc clamp mechanism for a disc apparatus is shown in FIGS. 10A to 14. The operation principle of this disc clamp mechanism for a disc apparatus will be described. In FIGS. 10A to 14, elements having similar functions to those of the conventional mechanism described with reference to FIGS. 7A to 9B are represented by using identical reference numerals, and the detailed description thereof is omitted.

Figure 10A:
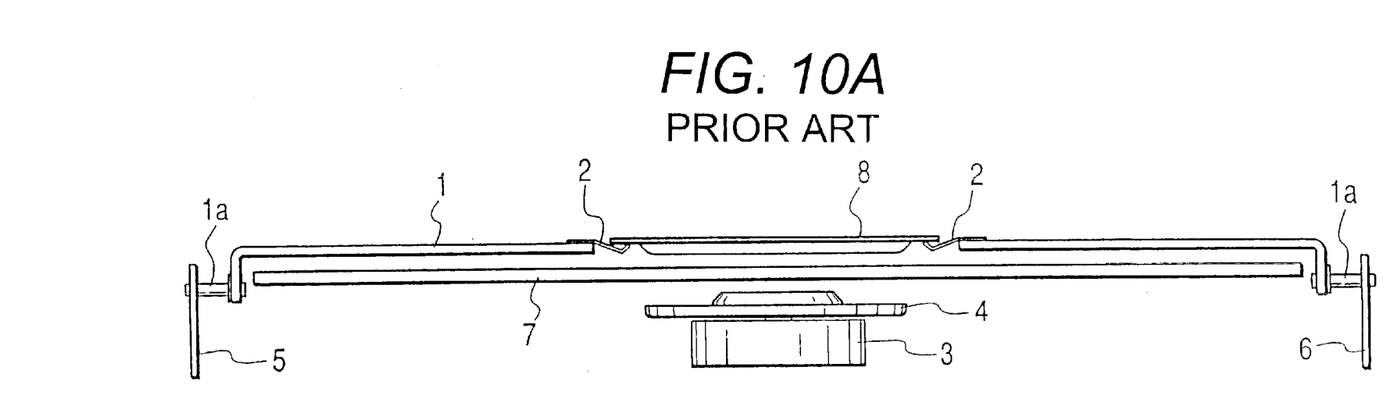
FIGS. 10A to 10C are front views showing an outline of the structure of another conventional disc clamp mechanism for a CD player, FIG. 10 showing a disc unclamp state, FIG. 10B showing a disc clamp state and FIG. 10C showing the details of a C portion in FIG. 10B.
Figure 10B:
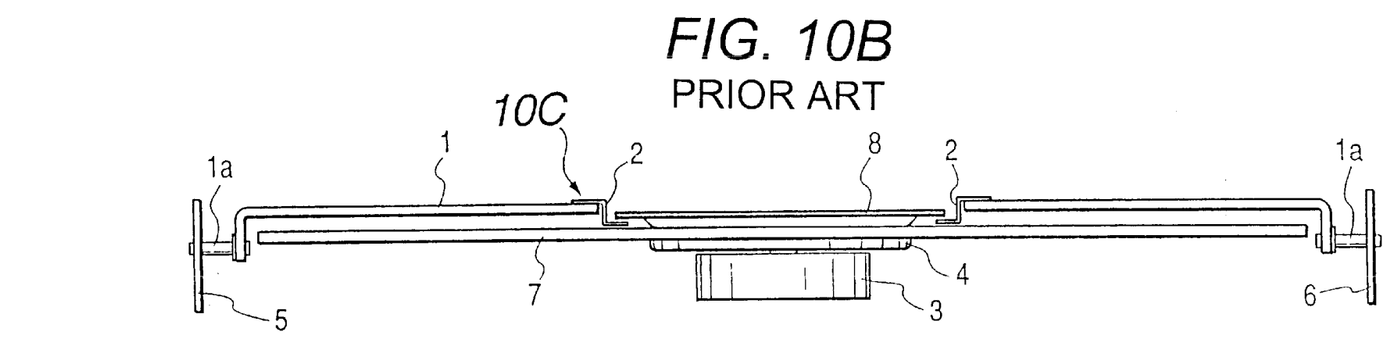

In this example, a clamper holder 2 is made of a plate spring. A contact portion of the clamper holder 2 with a clamper 8 is deformed upward in a disc unclamp state. In this state, the bottom surface of the clamper 8 held by the clamper holder 2 is raised higher than the bottom surface of a clamper holding chassis 1. FIG. 10B shows a clamp state of a disc 7.

With reference to FIGS. 11 to 14, the way the clamper holder 2 is deformed will be described. FIG. 12E shows the shape of the clamper holder 2. The clamper holder 2 has a projection 2a at its distal end portion. In a natural state not applied with a force, the clamper holder 2 is bent two steps so that the surface of the projection 2a is lower than its base end portion.

Figure 11:
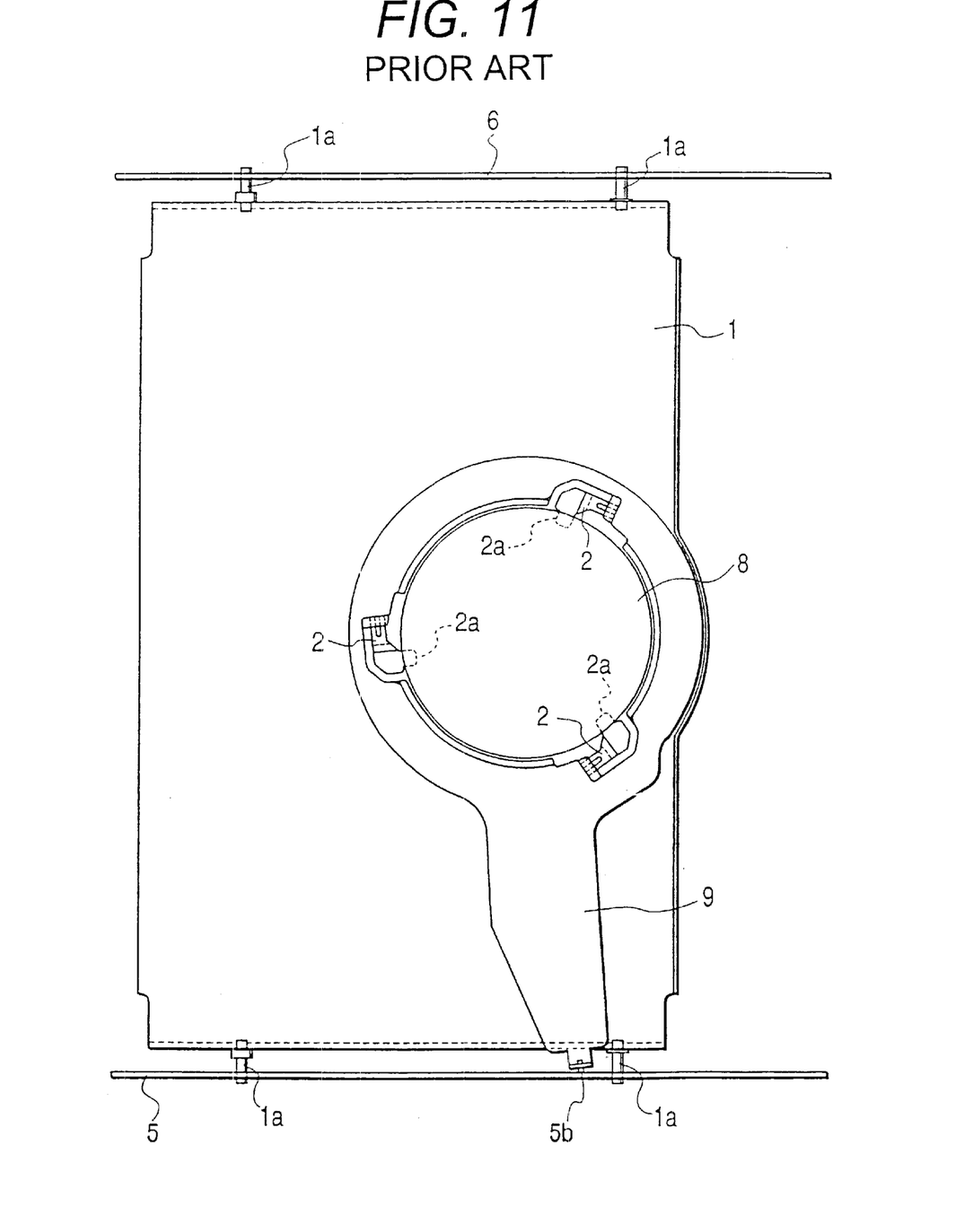
FIG. 11 is a plan view of the disc clamp mechanism shown in FIGS. 10A to 10C.
Figure 12A:
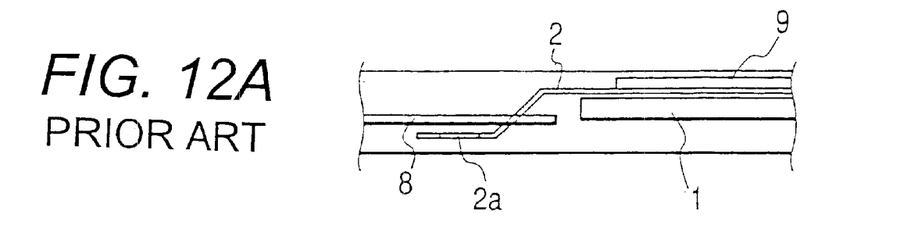
Figure 12B:
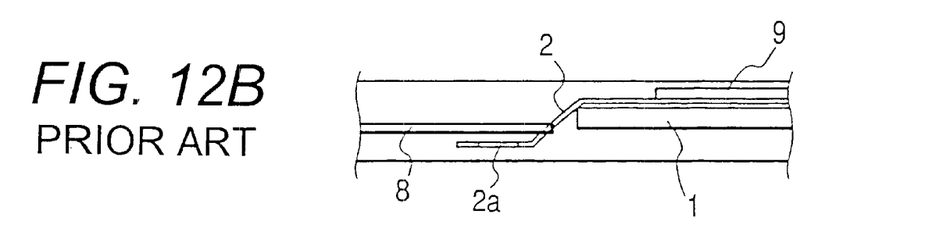
Figure 12C:
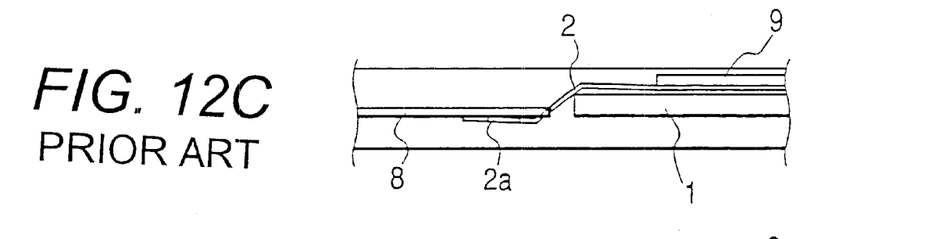
Figure 12D:
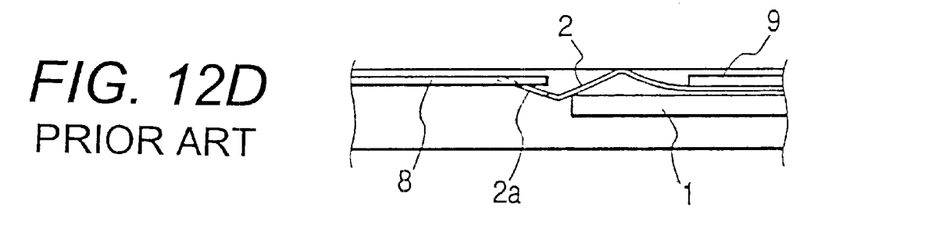
Figure 12E:
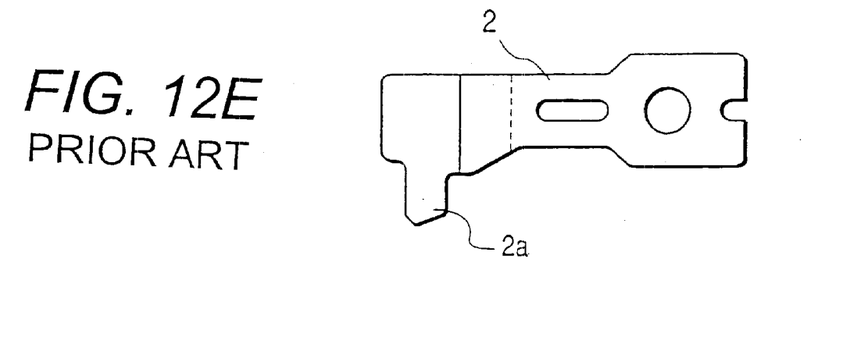
FIG. 12E is a plan view showing a clamper holder of the disc clamp mechanism.
Figure 13:
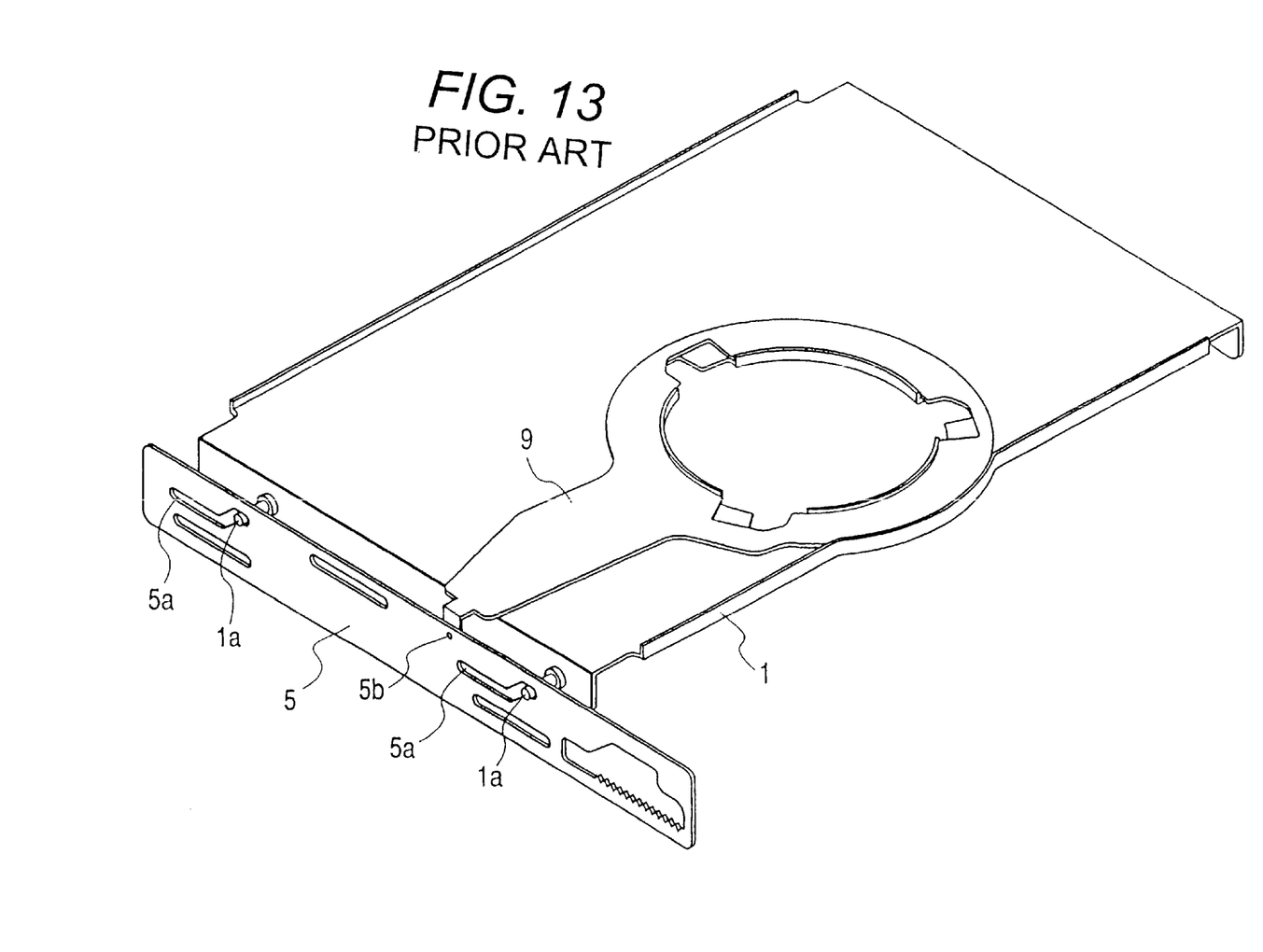
FIG. 13 is a perspective view of the disc clamp mechanism.
Figure 14:
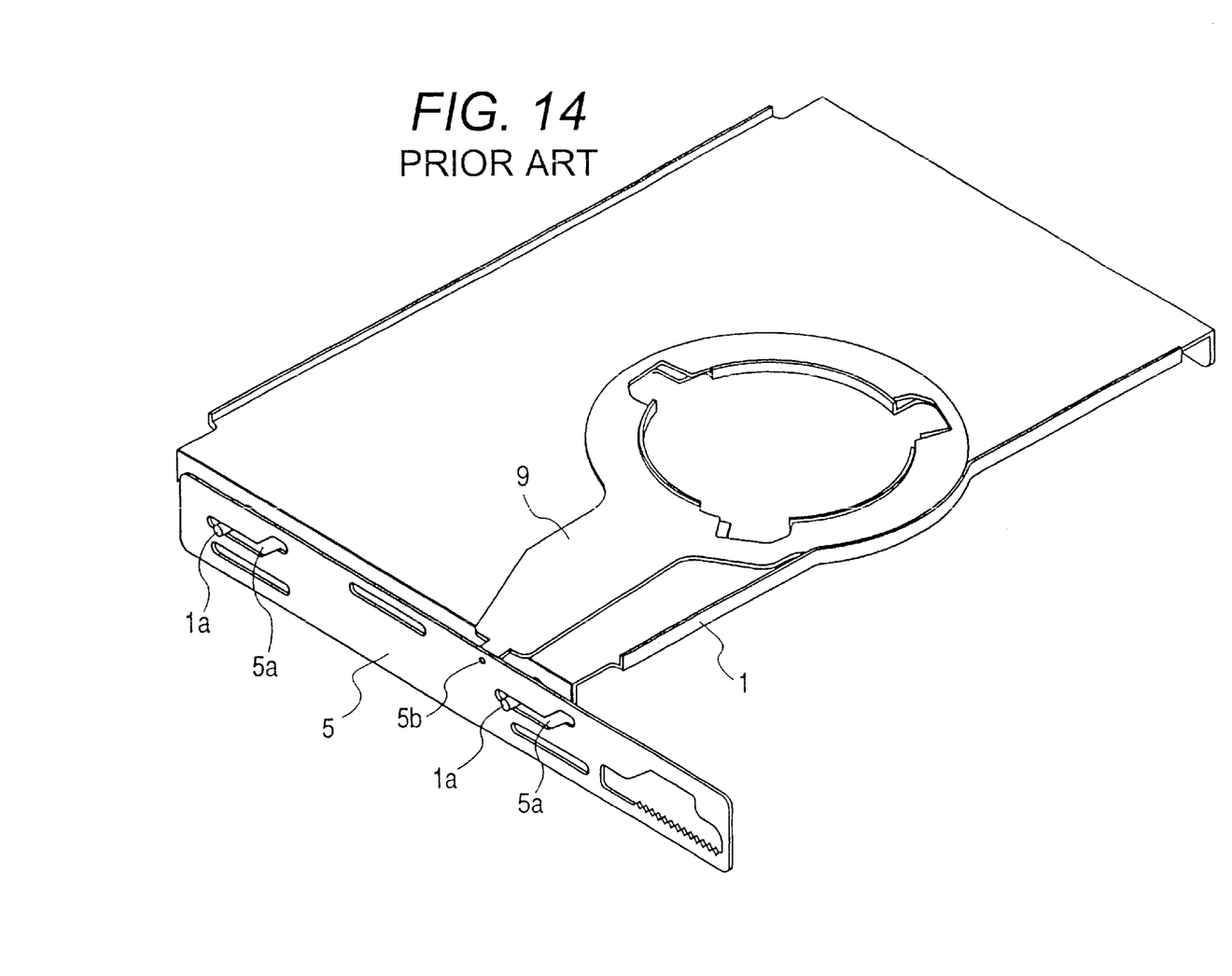
FIG. 14 is a perspective view showing another state of the disc clamp mechanism.

The fixed end portion of the clamper holder 2 is fixed to a lever 9 shown in FIG. 11. The lever 9 is rotatively fitted in the clamper holding chassis 1 and is rotated by a slider 5 as shown in FIGS. 13 and 14.

More specifically, a shaft 5b mounted upright on the slider 5 is inserted in a vertical groove (not visible in FIGS. 13 and 14) formed in a bent portion of the lever 9. As shown in FIG. 13, as the slider 5 makes the clamper holding chassis 1 rise, the lever 9 is rotated in the clockwise direction as viewed from a higher position, whereas as shown in FIG. 14, as the slider 5 makes the clamper holding chassis 1 lower, the lever 9 is rotated in the counter-clockwise direction as viewed from a higher position.

While the lever 9 is rotated as the clamper holding chassis 1 is raised or lowered, a relative motion of the lever 9 and clamper holding chassis 1 deforms the projection 2a of the clamper holder 2 fixed to the lever 9.

FIGS. 12A to 12D show a deformation of the projection 2a of the clamper holder 2. FIGS. 12A to 12D are drawn assuming that a weight of the clamper 8 is not applied to the clamper holder 2. The clamper holding chassis 1 is raised in the sequential order of FIGS. 12A to 12D. As shown, the projection 2a of the clamper holder 2 deforms along the motion direction of the clamper holding chassis 1.

Accordingly, as shown in FIG. 10A, the bottom surface of the clamper 8 becomes higher than the bottom surface of the clamper holding chassis 1 in the unclamp state of a disc 7. It is therefore possible to form a large space between the clamper 8 and a turntable 4 and prevent the disc 7 from contacting the clamper 8 or turntable 4 and being damaged while the disc 7 is transported. Furthermore, a stroke of the clamper holding chassis 1 necessary for reserving the space becomes small so that the disc apparatus can be made compact.

Figure 10C:
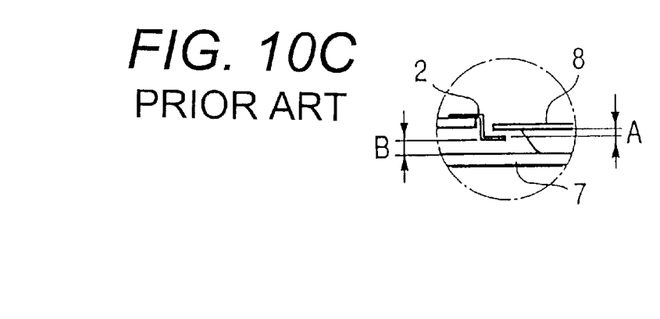

The disc clamp mechanism proposed in JP Patent Application No. 9-27354 described above has a sufficient space between the turntable 4 and clamper 8 when a disc is loaded or unloaded. However, as shown in FIGS. 10B and 10C, since the clamper holder 2 is positioned between the clamper 8 and disc 7 in the disc clamp state, a gap A (shown in FIG. 10C) between the clamper holder 2 and clamper 8 and a gap B (shown in FIG. 10C) between the clamper holder 2 and disc 7 are difficult to be made sufficient during the disc rotation.

Therefore, abnormal friction sounds between the clamper holder 2 and clamper 8 or disc damages to be caused by a contact between the clamper holder 2 and disc 7 may occur depending upon variations in sizes of components, variations in thicknesses of discs, rotation plane fluctuations and the like.

SUMMARY OF THE INVENTION

The invention has been made in view of the above problems. It is an object of the present invention to provide a disc clamp mechanism for a disc apparatus capable of providing a large space between a clamper and a turntable in a disc unclamp state even if the apparatus is made compact, and capable of preventing a contact between the clamper holder and clamper and between the clamper holder and disc while the disc is rotated.

According to one aspect of the present invention, there is provided a disc clamp mechanism for a disc apparatus for clamping or unclamping a disc by moving a clamper holding chassis near to or remote from a turntable, the clamper holding chassis holding a clamper with a clamper holder, wherein: a lever is rotatively supported by the clamper holding chassis and moved in cooperation with a motion of the clamper holding chassis; and a contact portion of the clamper holder with the clamper is displaced in a motion direction of the clamper holding chassis and a clamper radial direction relative to the clamper holding chassis, in cooperation with a motion of the lever relative to the clamper holding chassis.

In the disc clamp mechanism for a disc apparatus, the clamper holder may be made of a plate spring.

In the disc clamp mechanism for a disc apparatus, the contact portion of the clamper holder is moved in a direction away from the disc and in a direction away from the clamper when the disc is clamped.

BRIEF DESCRIPTION OF THE DRAWINGS

FIG. 2 is a side view of the disc clamp mechanism shown in FIG. 1, with partial components being seen through.

FIG. 3 is a plan view showing the main part of the disc clamp mechanism in another state, with a partial components being seen through.

FIG. 4 is a side view of the disc clamp mechanism shown in FIG. 3, with partial components being seen through.

FIG. 5 is a plan view showing the main part of the disc clamp mechanism in another state, with a partial components being seen through.

FIG. 6 is a side view of the disc clamp mechanism shown in FIG. 5, with partial components being seen through.

FIGS. 12A to 12E are partial side views illustrating the operation of the disc clamp mechanism.

DETAILED DESCRIPTION OF THE PREFERRED EMBODIMENTS

Figure 1:
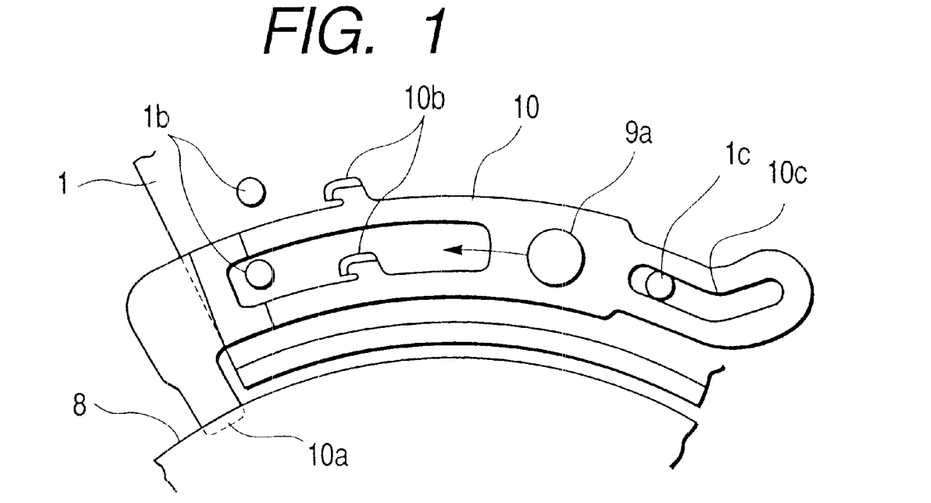
FIG. 1 is a plan view showing the main part of a disc clamp mechanism for a CD player, with partial components being seen through, according an embodiment of the invention.
Figure 2:
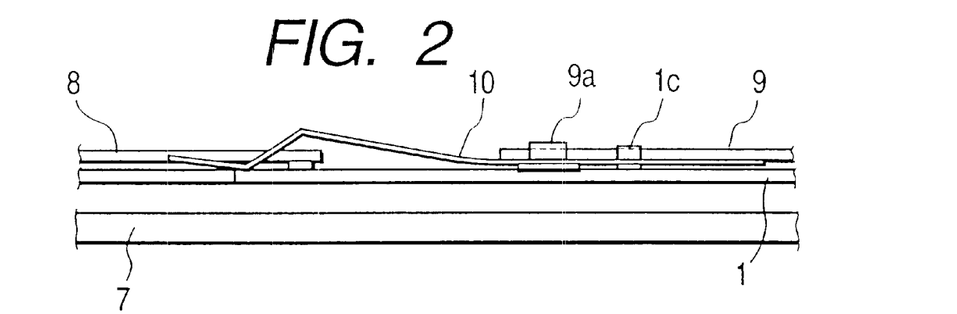
Figure 3:
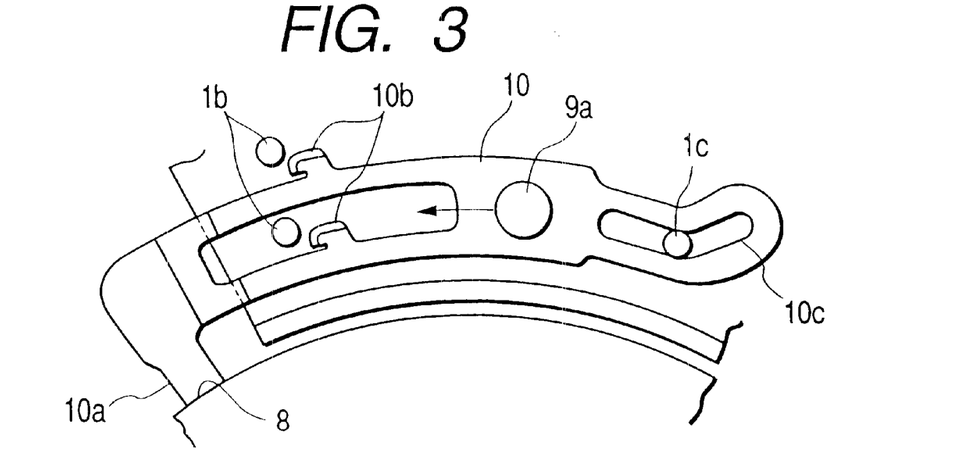

A disc clamp mechanism for a CD player according to an embodiment of the invention will be described with reference to the accompanying drawings. FIGS. 1 to 6 show the main part of the disc clamp mechanism of the embodiment. As the conventional disc clamp mechanism, a lever 9 of the disc clamp mechanism of this embodiment is fitted in a clamper holding chassis 1, and rotated as the clamper holding chassis 1 is raised and lowered. In FIGS. 1, 3 and 5, the lever is not shown.

A clamper holder 10 made of a plate spring is rotatively supported by a shaft 9a mounted upright on the lever 9. A pin 1c mounted upright on the clamper holding chassis 1 is inserted into a cam groove 10c of the clamper holder 10. As the lever 9 is moved relative to the clamper holding chassis 1, the clamper holder 10 rotates about the shaft 9a. The clamper holder 10 is provided with a projection 10a for raising a clamper 8 and projection parts 10b for abutting on protruding portions 1b formed on the clamper holding chassis 1.

FIGS. 1 and 2 show the state while a disc is transported between the clamper 8 and a turntable (not shown). In this state, the clamper holding chassis 1 is at a raised position, and the lever 9 is at a position that the lever is rotated in the clockwise direction relative to the clamper holding chassis 1. Therefore, the clamper holder 10 is at a position that the clamper holder 10 is rotated about the shaft 9a in the counter-clockwise direction, and the projection 10a enters under the clamper 8. The clamper holder 10 is deformed upward by the clamper holding chassis 1 so that the clamper 8 is raised high. A distance between the clamper 8 and disc 7 is therefore long.

As the disc 7 is transported to a predetermined position above the turntable (not shown, refer to conventional mechanisms), sliders 5 and 6 (not shown, refer to conventional mechanisms) start moving so that the clamper holding chassis 1 lowers and the lever 9 together with the clamper holder 10 rotates in the counter-clockwise direction as viewed from a higher position.

Figure 4:
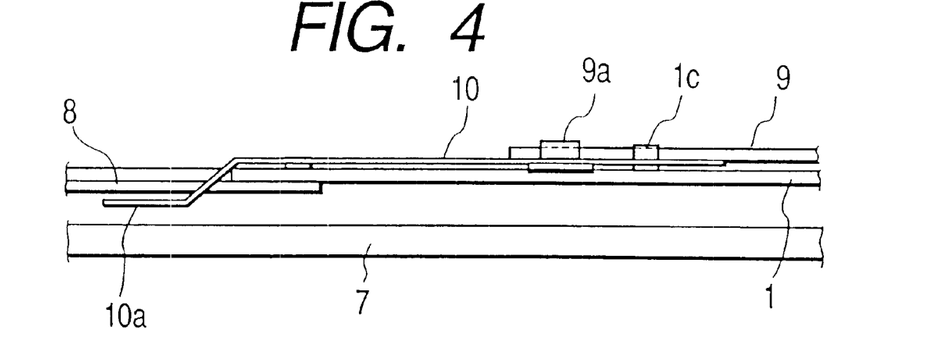
Figure 5:
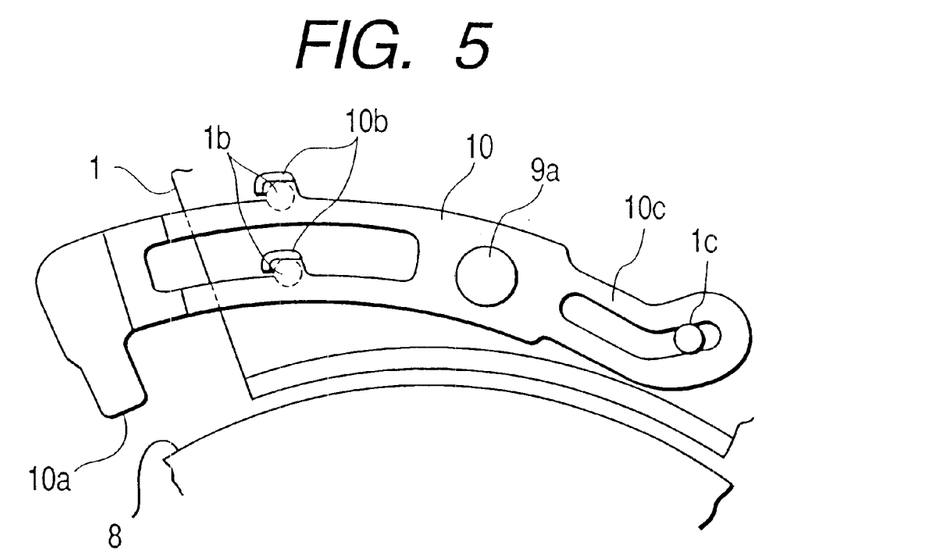

FIGS. 3 and 4 show the intermediate state during rotation. The clamper holder 10 deformed by the clamper chassis 1 is released from a pushing force by the clamper holding chassis 1. Therefore, the clamper holder 10 takes a free state and its projection 10a moves lower than the clamper holding chassis 1 and becomes spaced apart from the clamper 8. The clamper 8 is therefore lowered to a position where the disc 7 is squeezed, and the clamp state is established.

The lever 9 further rotates so that the clamper holder 10 rotates about the shaft 9a in the clockwise direction by a reaction between the cam groove 10c and pin 1c and its projection 10a is spaced apart from the clamper 8. The protruding portions 1b and 1b raise the projection parts 10b and 10b so that the projection 10a of the clamper holder 10 is upward moved apart from the disc 7.

Figure 6:
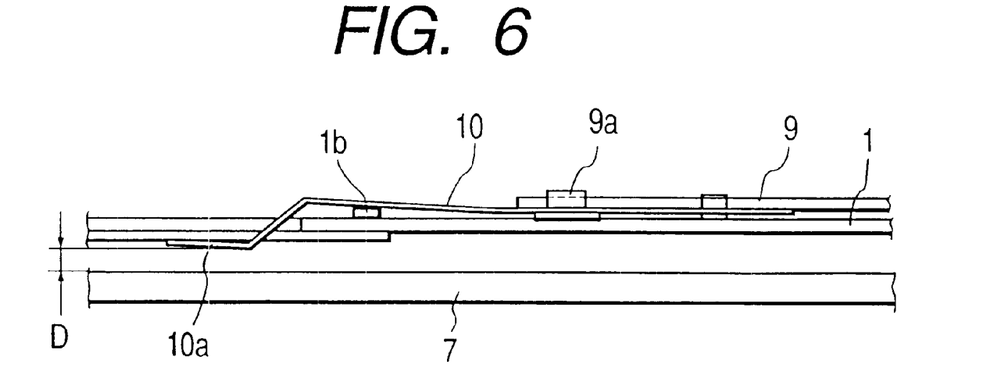

This state is shown in FIGS. 5 and 6. In this state, the disc 7 is rotated. As shown in FIG. 5, the projection 10a of the clamper holder 10 is spaced apart from the clamper 8 in a radial direction, and as shown in FIG. 6, the projection is spaced by a long distance D from the disc 7. It is therefore possible to prevent a contact between the disc 7 and clamper holder 10 and between the clamper 8 and clamper holder 10. Unclamping the disc is performed by the reversed operations described above.

The invention is not limited only to the embodiment described above. For example, the projection of the clamper holder may be deformed upward in a free state, and it may be lowered as the lever is moved in the disc clamp state.

The cam groove for rotating the clamper holder may be formed in the clamper holding chassis, and a pin engaging with the cam groove may be formed on the side of the clamper holder.

According to the disc clamp mechanism for a disc apparatus of this invention, since the bottom surface of the clamper can be made higher than the bottom surface of the clamper holding chassis in the disc unclamp state, a distance between the clamper and turntable can be made long so that it is possible to prevent a contact of the disc with the clamper or turntable during the disc transportation and any damage to be caused by the contact.

Furthermore, even during the disc rotation, it is possible to reliably prevent a contact between the clamper holder and clamper and between the clamper holder and disc, because a distance between the clamper holder and disc can be maintained sufficiently long.

What is claimed is:

1. A disc clamp mechanism for a disc apparatus having a movable member for holding a clamper with a clamper holder, the movable member being moved in a direction near to or away from a turntable on which a disc is placed, the clamper holder having a clamper contact portion with the clamper and being moved in a same direction as the motion direction of the movable member near to or away from the turntable, wherein:

said clamper contact portion is capable of moving in the motion direction of said movable member near to or away from the turntable and in a direction near to or away from a rotation center axis of said clamper, and when a disc is clamped, said clamper contact portion halts in a position away from said clamper and/or disc in order for said clamper contact portion not to contact said clamper and/or disc.

2. A disc clamp mechanism for a disc apparatus according to claim 1, wherein:

when a disc is clamped, said clamper contact portion moves in a direction away from the rotation center axis of said clamper after or simultaneously when the movable member is moved near to said turntable; and said clamper contact portion moves in a direction away from said turntable after or simultaneously when the clamper contact portion moves in the direction away from the rotation center axis of said clamper.

3. A disc clamp mechanism for a disc apparatus according to claim 1, wherein when a disc is unclamped, after or simultaneously when said clamper contact portion moves in a direction near to a rotation center axis of said clamper, said movable member moves in a direction away from said turntable.

4. A disc clamp mechanism for a disc apparatus according to claim 1, wherein:

when a disc is clamped, said movable member and said clamper holder are at positions where said movable member and said clamper holder are away from the turntable and said clamper contact portion is away from said clamper; and when a disc is unclamped, said movable member and said clamper holder are at positions where said movable member and said clamper holder are away from said turntable and said clamper contact portion is near to said clamper.

5. A disc clamp mechanism for a disc apparatus according to claim 1, wherein said clamper holder is made of a plate spring.

6. A disc clamp mechanism for a disc apparatus according to claim 1, wherein said clamper contact portion is a protrusion extending toward the rotation center axis of said clamper.

7. A disc clamp mechanism for a disc apparatus having a movable member for holding a clamper with a clamper holder, the movable member being moved in a direction near to or away from a turntable on which a disc is placed, the clamper holder having a clamper contact portion with the clamper and being moved in a same direction as the motion direction of the moveable member near to or away from the turntable, wherein:

said clamper contact portion moves in the motion direction of said movable member near to or away from the turntable and in a direction near to or away from a rotation center axis of said clamper;

when a disc is clamped, said clamper contact portion moves away from said clamper and/or disc in order for said clamper contact portion not to contact said clamper and/or disc; and when the disc is unclamped, said clamper contact portion moves toward said clamper in order to hold the clamper.

8. A disc clamp mechanism for a disc apparatus for holding a clamper with a clamper holder, said mechanism comprising:

a turntable on which a disc is placed;

a movable member which mounts said clamper and said clamper holder and is moved in a direction near to or away from the turntable; and said clamper holder for clamping and unclamping the disc by moving near to or away from said turntable, said clamper holder having a clamper contact portion for contacting said clamper, wherein said clamper contact portion is capable of moving in a direction near to or away from said turntable and in a direction near to or away from a rotation center axis of said clamper, and when a disc is clamped, said clamper contact portion halts in a position away from said clamper and/or disc in order for said clamper contact portion not to contact said clamper and/or disc.

9. A disc clamp mechanism for clamping a disc on a turntable of a disc apparatus, said mechanism comprising:

a movable member being movable in a direction near to or away from the turntable and having an opening with a diameter at least larger than a diameter of a clamper;

a rotary member rotatable relative to said movable member in position alignment with the opening of said movable member, said rotary member in position opening with a diameter at least larger than the diameter of the clamper; and a clamper holder for holding the clamper by extending through the opening of said movable member, said clamper holder moving in a direction near to or away from the turntable in cooperation with a rotation of said rotary member, wherein said clamper holder has a clamper contact portion which is movable in a direction near to or away from a rotation center axis of the clamper and in a direction near to or away from the turntable, and when a disc is clamped, said clamper contact portion halts in a position away from said clamper and/or disc in order for said clamper contact portion not to contact said clamper and/or disc.

10. A disc clamp mechanism according to claim 9, wherein:

when a disc is clamped, said clamper contact portion moves in the direction near to the turntable as said rotary member rotates in cooperation with a motion of said movable member; and thereafter the clamper contact portion moves in the direction away from the rotation center axis of the clamper and in the direction away from the turntable in order for said clamper contact portion not to contact the clamper and/or disc.

11. A disc clamp mechanism according to claim 9, wherein:

when a disc is unclamped, said rotary member rotates in cooperation with a motion of said movable member, and said clamper contact portion moves in the direction near to the turntable and in the direction near to the rotation center of the clamper; and thereafter said clamper contact portion moves in the direction away from the turntable.

12. A disc clamp mechanism according to claim 8 or 9, wherein said clamper holder is made of a plate spring.

13. A disc clamp mechanism according to claim 8 or 9, wherein the clamper contact portion is a protrusion extending toward the rotation center axis of the clamper.

14. A disc clamp mechanism according to claim 9, wherein:

said clamper holder has a cam groove operating in cooperation with a rotation of said rotary member;

the cam groove includes an arc first cam groove in parallel to the opening of said rotary member and a second cam groove continuous with the first cam groove and not in parallel to the opening;

said movable member has a pin inserted into the cam groove;

said movable member has a protruding portion for moving said movable member away from said clamper holder;

said clamper contact portion is moved in the direction near to or away from said movable member by a reaction of the first cam groove and the pin to be caused by a rotation of said rotary member;

said clamper contact portion is moved in the direction near to or away from the rotation center axis of the clamper by a reaction of the second cam groove and the pin; and the clamper contact portion is moved in the direction near to or away from the turntable by a reaction of the protruding portion and said clamper holder.

15. A disc clamp mechanism according to claim 12, wherein said clamper holder comprises:

a first flat portion having a cam groove;

a second flat portion having the clamper contact portion; and a third flat portion coupled to the first and second flat portions at different angles, wherein the third flat portion reacts with a peripheral member to move the clamper contact portion in the direction near to or away from said turntable.

* * * * *